June 11, 1957   R. S. TURNER   2,795,363
REMOVABLE CARRIER BOX FOR AN AUTOMOBILE TRUNK
Filed May 9, 1955   2 Sheets-Sheet 2
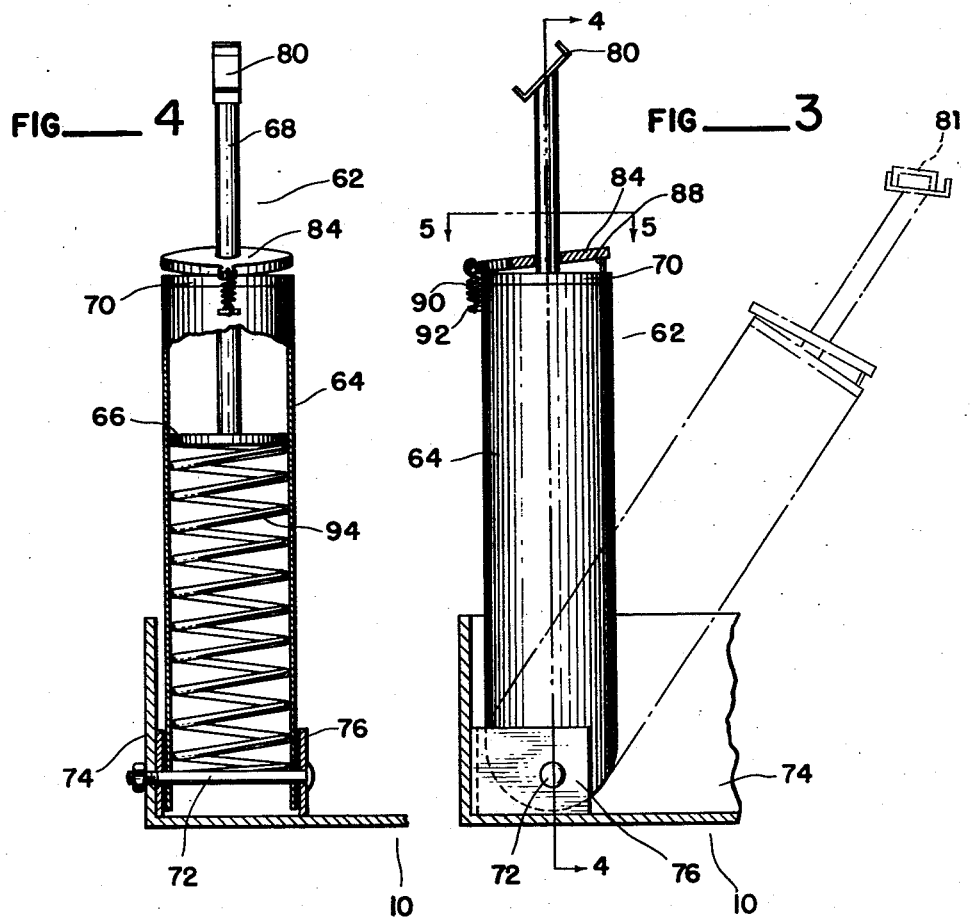
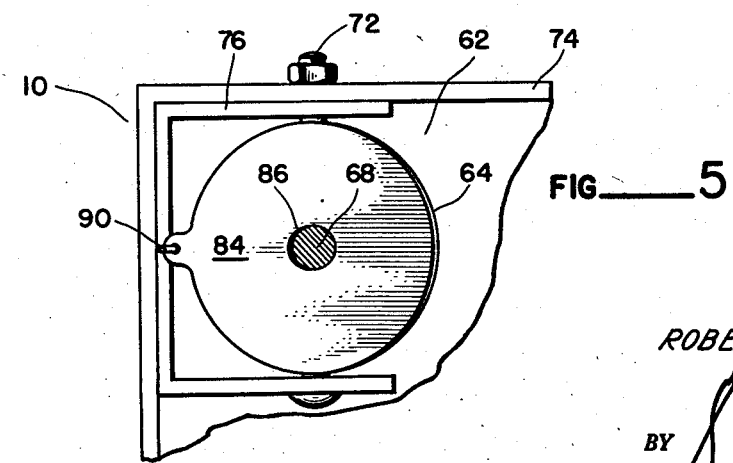
ROBERT S. TURNER
INVENTOR.

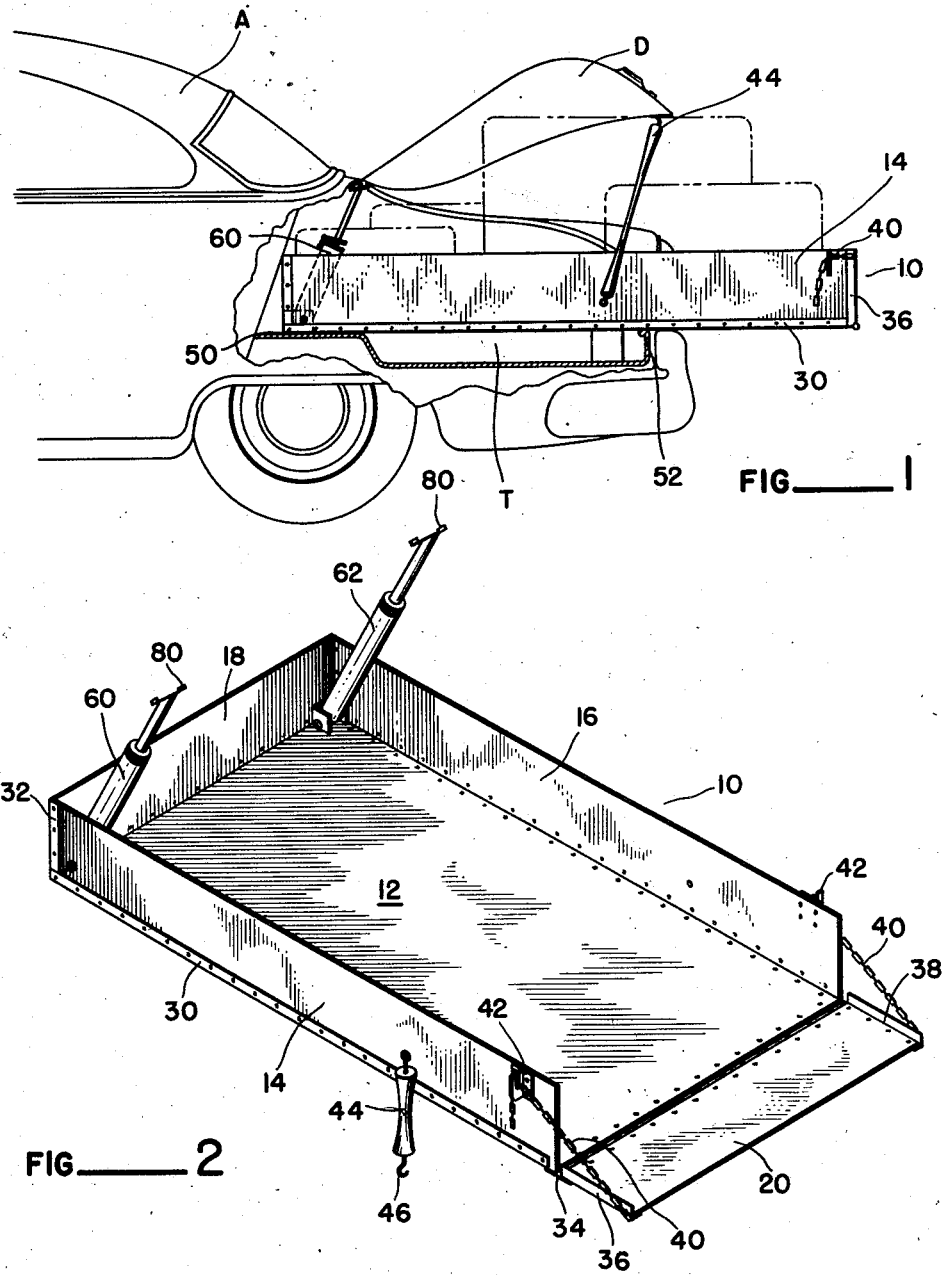

United States Patent Office 2,795,363
Patented June 11, 1957

2,795,363
REMOVABLE CARRIER BOX FOR AN AUTOMOBILE TRUNK

Robert S. Turner, Seattle, Wash.

Application May 9, 1955, Serial No. 507,050

5 Claims. (Cl. 224—42.43)

My invention relates to car carriers and, more particularly, to a removable carrier box for an automobile trunk. Briefly, the carrier includes a box extending from the forward or inner part of the trunk compartment to behind the bumper and secured in place by a pair of extensible, contractible arms acting between the forward end of the carrier box and the car frame thereabove.

Realizing the need, by many automobile owners, of means to enlarge the effective capacity of the trunk and to make it more adaptable for carrying certain loads, some prior inventors have provided a structure forming a box in the car trunk. However, those observed have not thoroughly met the need for a device having the following characteristics:

1. The provision of sufficient capacity.
2. When the carrier is not in use, restoring the trunk substantially to its original condition so that it may carry its normal load with the trunk door in place.
3. If the box is removable, using a minimum weight.
4. Providing quick-acting means for installing and removing the box and yet providing adequately securing of the carrier.
5. Providing the above, together with such other features as will make the device thoroughly workable, in a construction having a minimum cost so that the selling price is reasonable to the average car owner. The majority of the prospective purchasers have only occasional need for this device and will not purchase it if the price is too high, i. e., instead they will rent a trailer, make more trips using the lesser capacity of the trunk, pay for delivery, etc.

The objectives of my invention include, therefore: to devise a carrier box for an automobile trunk of large capacity, of easy installation and removal, with a minimum weight, permitting normal use of the trunk when the carrier is not in use, adequately secured in place, of economical construction, and meeting the requirements outlined above, together with other desirable features.

My invention will be best understood, together with additional objective thereof, from the following description, read with reference to the drawings, in which:

Figure 1 is a side elevational view of the carrier box, forming a specific embodiment of my invention, shown together with parts of an automobile which has portions broken away to reveal the relationships involved;

Figure 2 is an enlarged perspective view of the carrier box;

Figure 3 is a side view, enlarged and partly in section, showing the securing means for the carrier box and indicating in dotted lines another position of the assembly;

Figure 4 is a view similar to Figure 3 but viewed from the front and partly sectioned on line 4—4 of Figure 3; and Figure 5 is an enlarged sectional view, in fragmentary form, taken on line 5—5 of Figure 3.

Although some carriers have been provided to collapse within the car trunk when not in use, these collapsed devices usually limit the space in the trunk when not extended and the trunk does not have normal capacity with the door down. Also, the collapsing construction is expensive to manufacture and is less adaptable to various makes of cars. For these reasons, among others, I have devised a removable box 10. With a removable box, light weight is important, and with the construction described below, one man can readily handle this box for removal and installation.

It will be seen from Figures 1 and 2 that my carrier box 10 has a minimum weight consonant with other requirements such as durability. Box 10 has a bottom 12, side walls 14, 16, front wall 18 and a tailgate 20, each preferably formed of a light, durable wood such as a ½-inch, exterior grade fir plywood. The walls are joined by angle bars, such as 30, 32, riveted or bolted to the wood panels.

Tailgate 20 is hinged to the rear edge of bottom 12 by a piano type hinge 34 and is reinforced at its ends by angle bars 36, 38. The tailgate is secured by chains 40 engaging slotted fasteners 42 on the side wall panels 14, 16. Although the tailgate could be eliminated and a fixed end wall be used, the tailgate is often desirable to accommodate loads such as lumber that are longer than the box or to avoid lifting heavy articles the extra height of the end wall.

Convenient means for securing the car trunk door in place is the use of an elastic snubber 44 pivotally secured to the box side wall at one end and having a hook 46 at the other end to engage with some suitable place on the underside of the trunk door D. The interior framing of the door usually is relieved by open work to reduce weight, and the open work forms a suitable place for engaging hook 46.

The widths of trunks in various makes of cars are comparable, and the width of bottom 12 is designed to sit in any of the standard makes and will not waste much room even with the widest trunk. The trunks also vary in depth, but my securing means makes one length of box adaptable for most standard makes. Maximum capacity lengthwise is provided by having the forward end of the box extending to the forward wall of trunk T and by having the rear end extending over the bumper and cantilevered therebeyond. The maximum effective height is obtained by resting carrier bottom 12 on the floor of trunk T, and the resting surfaces usually comprise a forward trunk platform 50 over the car axle and a short rear wall 52 adjacent the car bumper. These resting surfaces are normally about the same level so that the bottom of the carrier is not canted. The load shown in Figure 1 indicates a number of suitcases and illustrates the maximum capacity provided by my carrier and the securing of trunk door D with various types of loads.

One of the most difficult problems in forming a removable carrier is to provide securing means that are quick acting, adaptable to various makes of cars and of economical manufacture. I have successfully met these objectives with extensible, contractible arms 60, 62 shown.

Each arm includes a cylinder 64, a piston 66 slidable therein, and a piston rod 68 slidable along the axis of the cylinder and guided by an opening in a top plate 70 on the cylinder. Cylinders 64 are pivotally secured at the forward corners of box 10 by bolts 72 extending through the angle bar 74, a channel shaped support 76, and the walls of cylinder 64. The top end of the arms pivot from an upright position rearwardly, as indicated in dotted lines in Figure 3.

The upper end of piston rod 68 has a car frame engaging member 80 which conveniently takes the form of a canted channel shaped member. The body of the automobile A in the various makes has a structural member, as 81, adjacent the attachment of the hinge of trunk door D and engaging member 80 will find an engaging surface there. Car frame member 81 is rearward of the forward end of the trunk compartment T. This location is important to my securing means in that arms 60, 62 can extend forwardly and downwardly from engaging member 80; and the arms not only hold down the forward end of box 10, but also restrain it from rearward movement. My securing means 60, 62 have been tested and have been found thoroughly workable; and it is surprising that this structure forms such a quick, adequate and economical locking of the carrier box both against tilting and against rearward slipping.

A quick-acting lock is provided for piston rod 68 by a locking plate 84. Plate 84 has an opening 86 permitting piston rod 68 to pass in a normal disposition thereto but locking it against movement when disposed oblique thereto, in the position shown in Figures 4 and 5, by engagement of the edges of opening 86 with piston rod 68.

Locking plate 84 grips rod 68 when it assumes the Figure 3—Figure 4 position. A fulcrum 88 under one edge and a tension spring 90 acting between the other edge and a pin 92 on the cylinder casing 64, normally tilt locking plate 84 to the locked oblique position. The locking plate 84 is brought to a releasing position by manually grasping and moving the plate to the normal or perpendicular position. Considerable vibration occurs when the car is traveling, and a compression spring 94 acting between the underside of piston 66 and bolt 72 applies an upward pressure on piston rod 68 which holds the locked engagement with locking plate 84 against any slipping due to vibration. Compression spring 94 also automatically extends piston rod 68 to engage the car frame when locking plate 84 is released.

From the foregoing description it will be evident how the various objectives have been met and the various advantages of my structure. My carrier box has proved to be surprisingly adaptable to the needs of the usual car owner while being capable of sale at a price he is able to afford.

Having thus described my invention, I do not wish to be limited to the exact details of construction shown, but wish to cover those modifications, which will occur to those skilled in the art, which are properly within the scope of my invention, as described in the appended claims.

I claim:

1. The combination with an automobile having a rearwardly open trunk and a trunk door covering the trunk opening and hinged at its inner upper edge to the automobile body, of a removable carrier box, comprising: said box having a width less than the width of the trunk opening and having a length to extend from the front wall of the trunk to behind the automobile bumper, the carrier box including a bottom and upwardly extending side walls of less height than the trunk, said bottom resting on the trunk floor and associated auto frame, and an extensible, contractible arm, lockable against compressive forces, having one end engaging said carrier box at the forward portion thereof and having the other end bearing on the auto body adjacent the hinged connection of said trunk door, thereby securing the front end of said box from tilting and escape.

2. The subject matter of claim 1 in which there are two extensible, contractible arms each located in a forward corner of the box and each bearing on the auto body at points laterally spaced apart from each other and rearward of the points of attachment to the box.

3. The subject matter of claim 1 in which there is an elastic snubber secured to the rear portion of the box at one end and having a hook at the other end engaging the pivoting end of said trunk door securing the door from upward swinging.

4. The subject matter of claim 1 in which said extensible, contractible arm includes a lower cylinder pivotally secured to the box, a piston positioned in said cylinder and a piston rod upwardly extending from the piston and having an engaging member at its upper end, a compression spring in said cylinder upwardly pressing on said piston and a locking plate at the upper end of said cylinder having an opening through which said piston rod extends, the plate being pivotally supported at one edge and having a spring acting between the other edge and the cylinder normally pressing the plate to a position oblique to the axis of the piston rod in which the walls of said opening grip said piston rod, locking it in position, and the plate when manually pivoted to a position normal to the piston rod releasing the same.

5. A carrier box to be removably positioned in a car trunk, comprising: a box having bottom and side walls of a width less than the width of the conventional car trunk and having a length in excess of the depth of the conventional car trunk, and an upright extensible, contractible arm, lockable against compressive forces, pivotally bearing on the forward end of the box at its lower end and having engaging means at its other end to engage the upper inside wall of said car trunk.

References Cited in the file of this patent
UNITED STATES PATENTS

| | | |
|---|---|---|
| 2,541,244 | Hack | Feb. 13, 1951 |
| 2,576,385 | Bigsby | Nov. 27, 1951 |
| 2,628,140 | Bunce | Feb. 10, 1953 |
| 2,663,474 | Kelly | Dec. 22, 1953 |